E. T. TURNEY.
BRAIDING MACHINE.
APPLICATION FILED NOV. 29, 1918.
1,356,570. Patented Oct. 26, 1920.
6 SHEETS—SHEET 4.
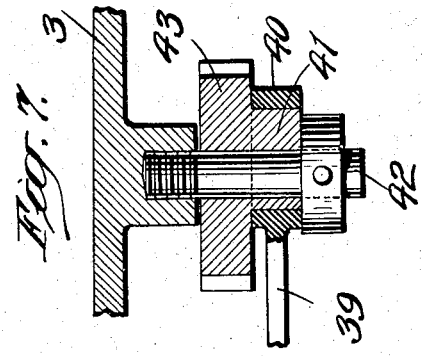
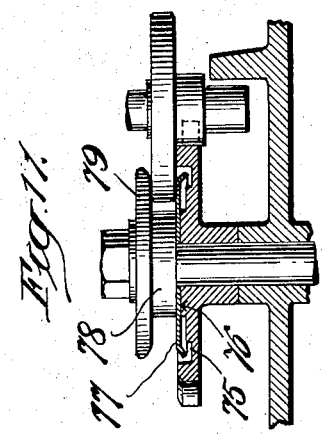
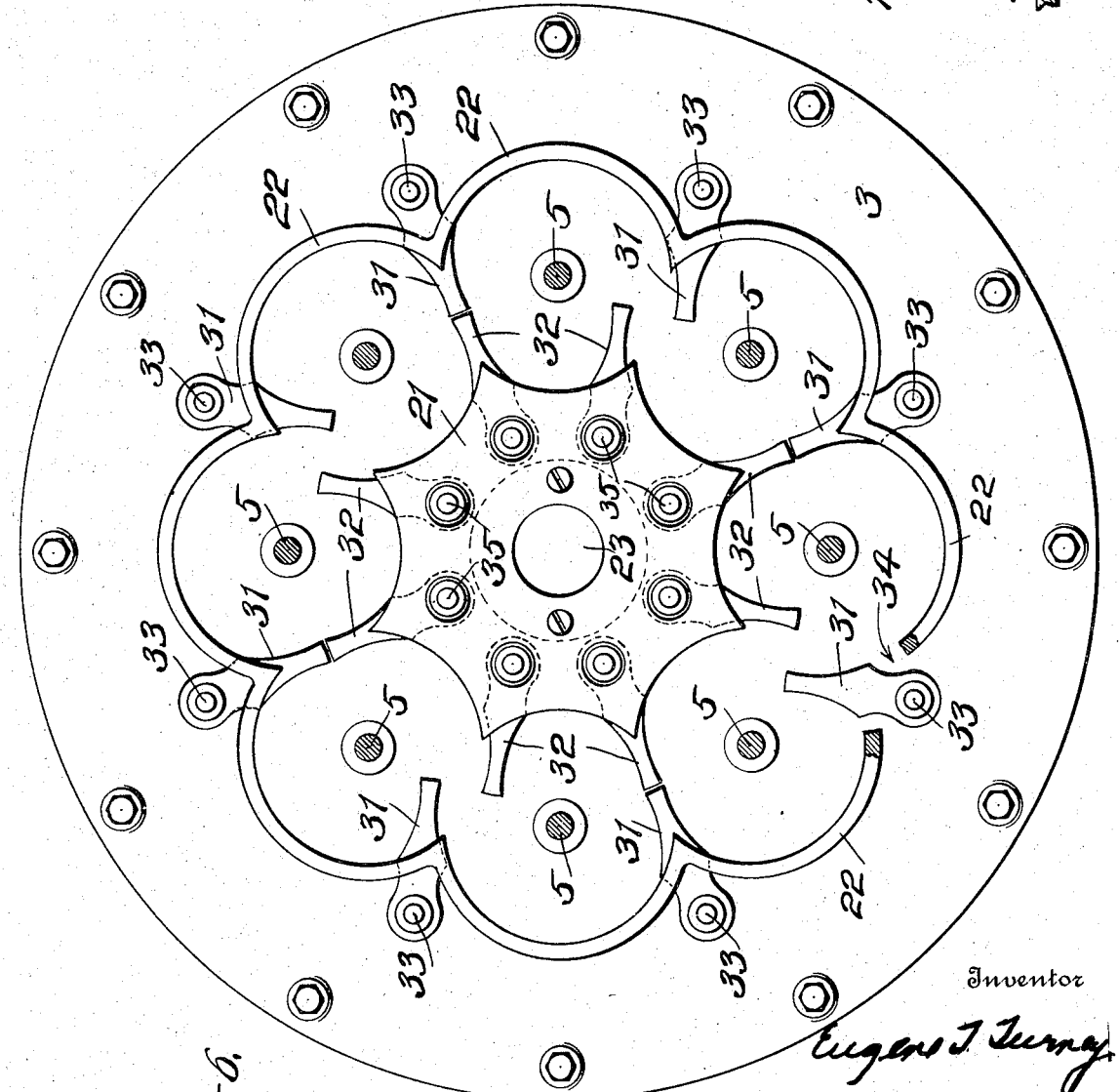

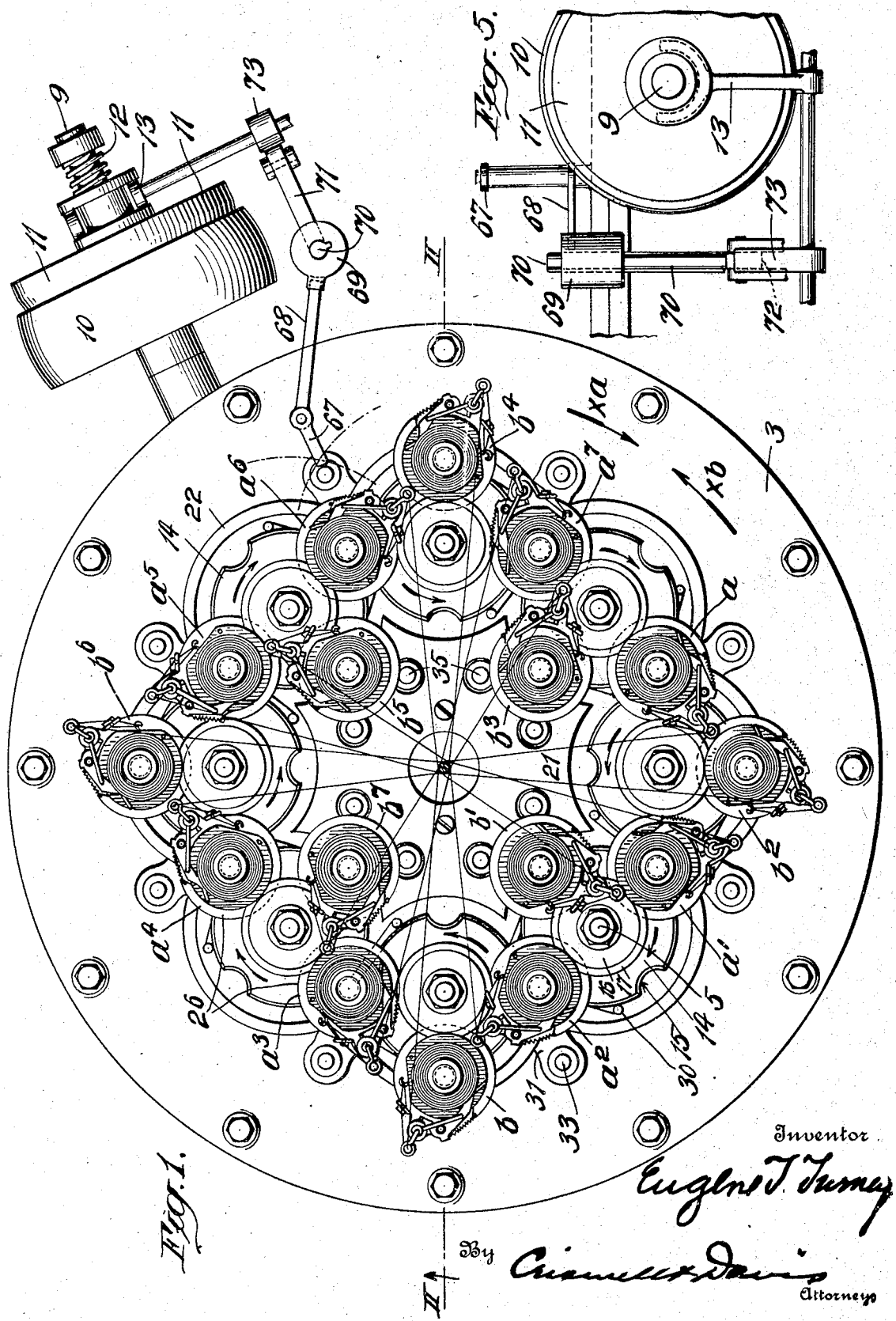

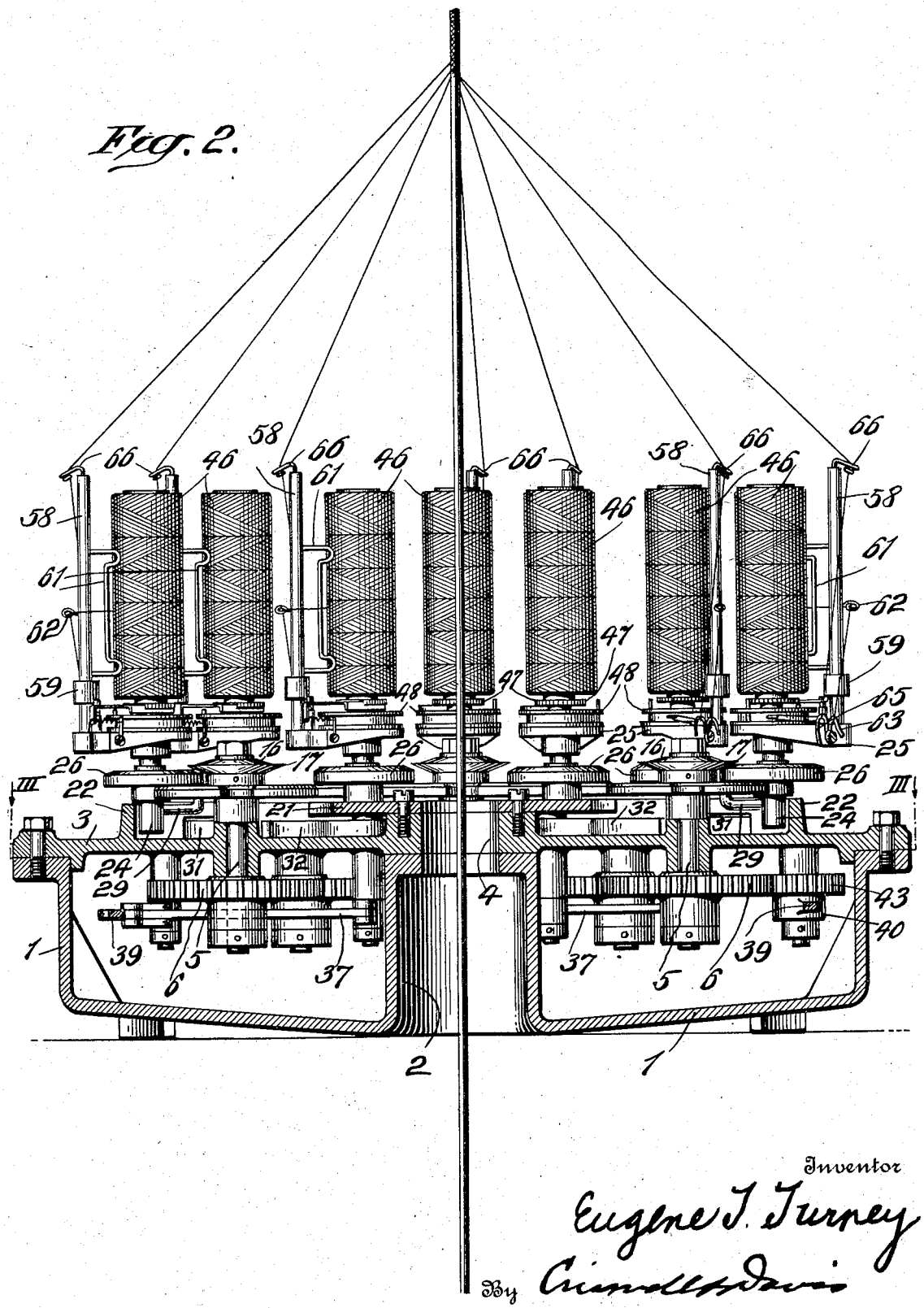

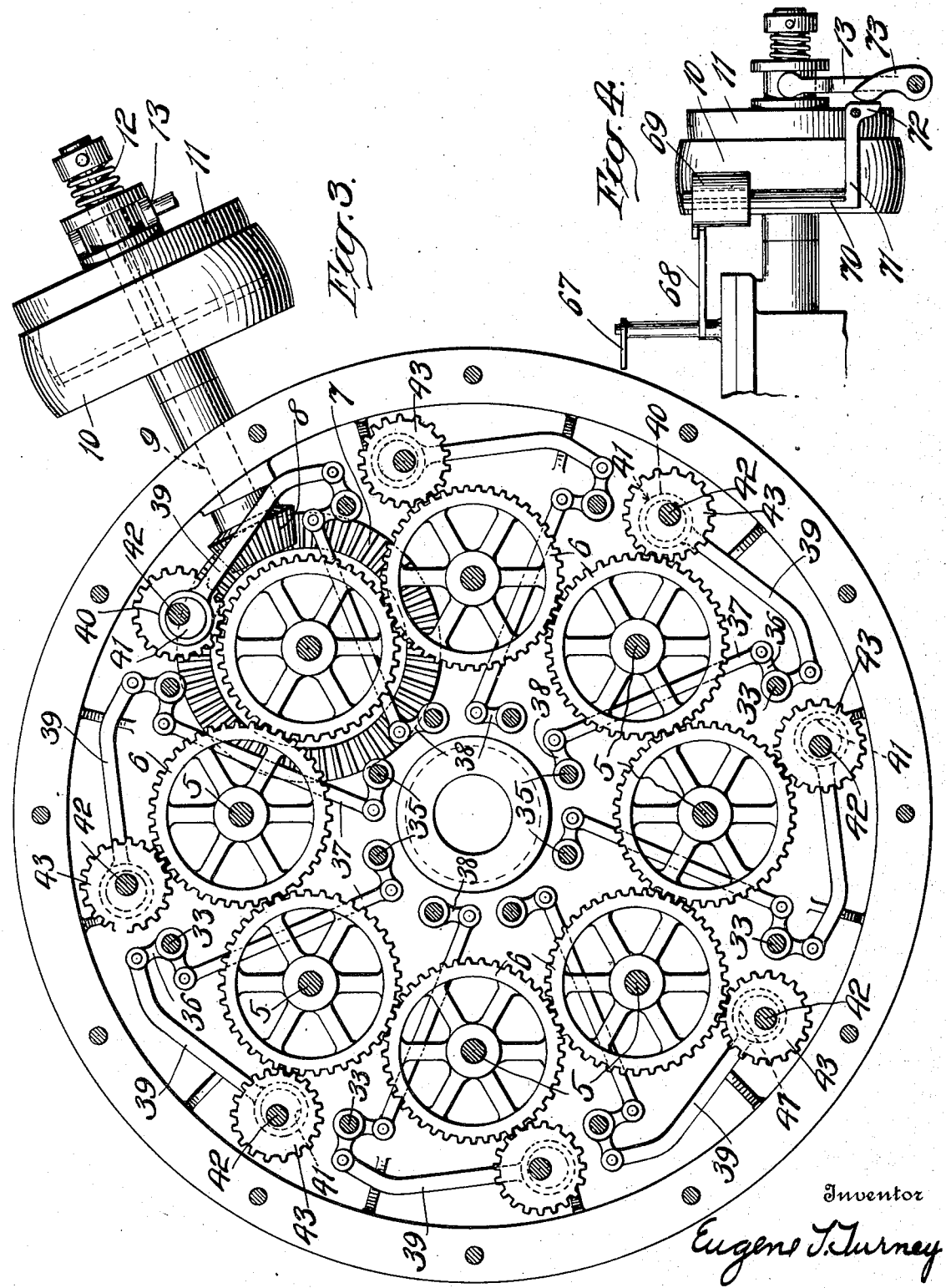

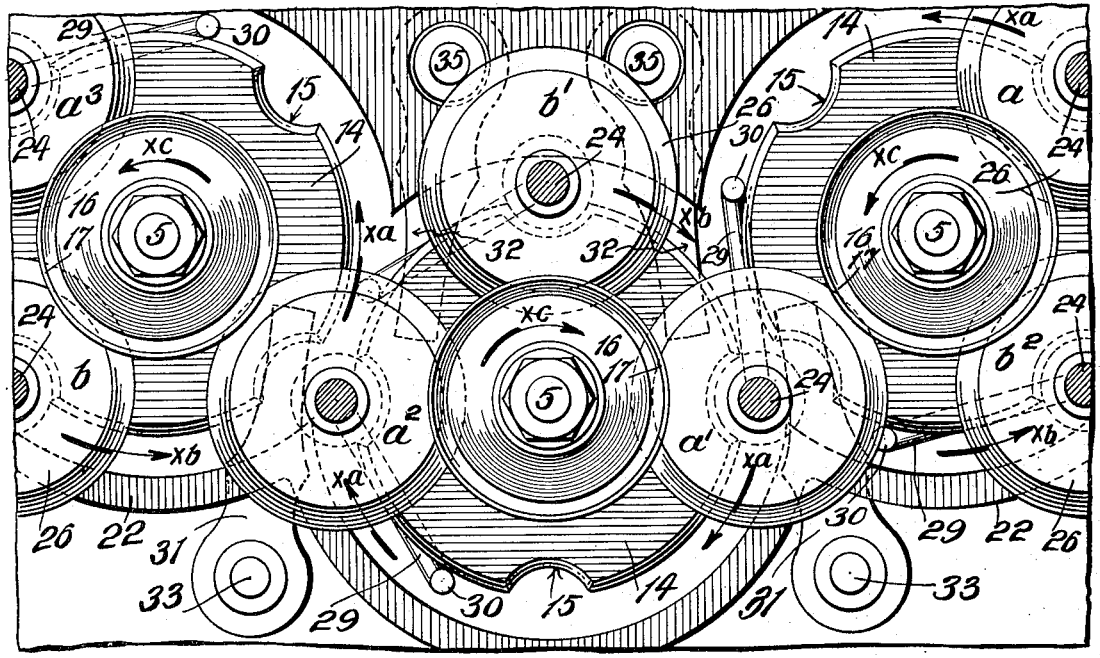
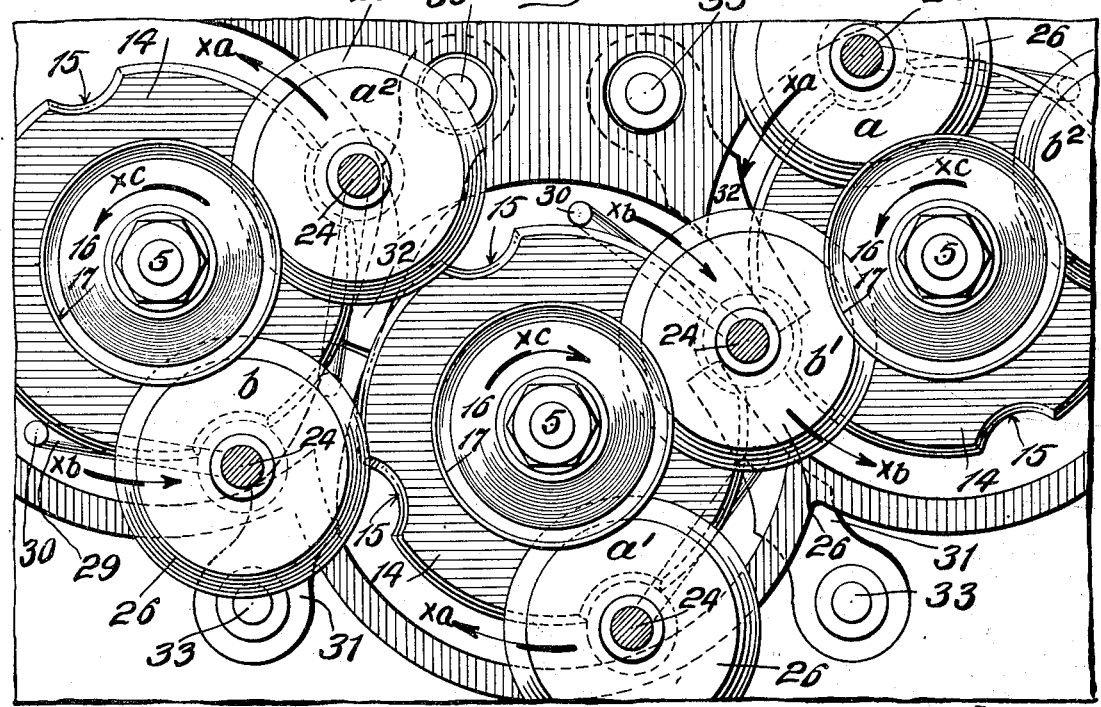

E. T. TURNEY.
BRAIDING MACHINE.
APPLICATION FILED NOV. 29, 1918.
1,356,570.
Patented Oct. 26, 1920.
6 SHEETS—SHEET 6.
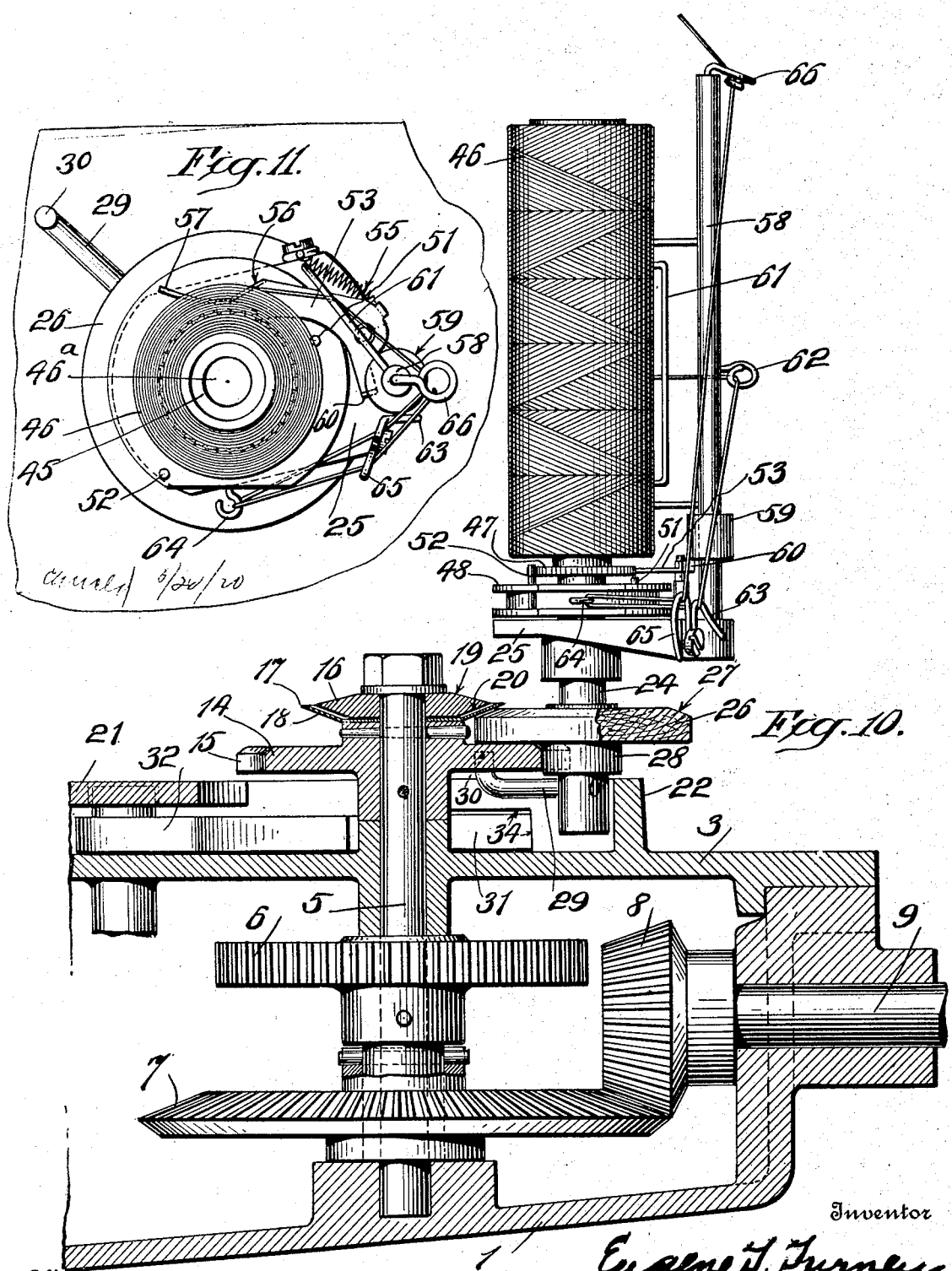

UNITED STATES PATENT OFFICE.

EUGENE T. TURNEY, OF NEW YORK, N. Y., ASSIGNOR TO NATIONAL INDICATOR COMPANY, OF LONG ISLAND CITY, NEW YORK, A CORPORATION OF NEW YORK.

BRAIDING-MACHINE.

1,356,570.     Specification of Letters Patent.     Patented Oct. 26, 1920.

Application filed November 29, 1918. Serial No. 264,596.

*To all whom it may concern:*

Be it known that I, EUGENE T. TURNEY, a citizen of the United States, and resident of the borough of Bronx, county of Bronx, city and State of New York, have invented certain new and useful Improvements in Braiding-Machines, of which the following is a specification.

This invention relates to that type of machines designed for producing a tubular braided structure, either in the form of a covering for a cord or as a tubular braided cord or rope. The invention further relates to that type of braiding machines in which two annular series of spools or bobbins are mounted to move in an annular orbit, one series of spools moving in its orbit in the opposite direction to the movement of the other series of spools, and both series of spools being moved in such manner as to interlace and weave the threads.

One of the main objects of the invention is to mount the bobbins or spools upon free, floating carriers and to move said carriers in their annular orbit about the machine by means of transfer devices, said transfer devices constituting the carrier moving means.

Another important object of the invention is to move both sets or series of carriers around the machine in opposite directions by the same set of transfer devices.

Another object of the invention is to move the carriers about the machine in opposite directions by rotary transfer devices; and to provide means whereby the carriers will be frictionally engaged by the transfer devices.

Another object of the invention is to provide switch devices operating to disconnect the carriers from one transfer device to cause them to engage the next adjacent transfer device, so that the carriers will be advanced around the machine by a successive engagement and disengagement of the rotating transfer devices.

Another object of the invention is to provide a braiding machine having two series of bobbin carriers and a single series of rotatable transfer devices, and to provide means for switching the carriers from one transfer device to the next adjacent one and to cause the carriers to engage the transfer devices in such manner that one series of bobbin carriers will move around the machine in one direction and the other series of bobbin carriers will move around the machine in the opposite direction and in such manner that the cords or threads will be interlaced and braided at the center of the machine.

Another object of the invention is to provide a simplified and improved bobbin carrier; and to provide such carrier with an improved and simplified tension means and an automatic break-thread stop.

There are other important objects and advantages of this invention, all of which will fully hereinafter appear.

In the drawings, Figure 1 is a plan view of the machine;

Fig. 2 a central vertical sectional view on the line II—II of Fig. 1;

Fig. 3 a horizontal sectional view on the line III—III of Fig. 2;

Fig. 4 a detail side elevation of a part of the automatic break-thread stop device;

Fig. 5 a detail end view of the mechanism shown in Fig. 4;

Fig. 6 a detail plan view of the base or support, the transfer shafts being shown in sectional view;

Fig. 7 a detail vertical sectional view of one of the switch-operating gears and eccentrics;

Fig. 8 a partial plan view of the transfer devices with the carrier disks engaged therewith;

Fig. 9 a view similar to Fig. 8 showing the carrier disks advanced slightly beyond the positions shown in Fig. 8;

Fig. 10 a vertical sectional view of a portion of the machine, showing one of the carriers in position;

Fig. 11 a detail sectional view of one of the transfer disks, showing a slightly modified form of the frictional gripping means.

Referring to the various parts by numerals, 1 designates the base of the machine, said base being in the form of a circular, comparatively shallow chamber having a central tubular post 2, the upper end of which is flush with the upper edge of the chamber and constitutes a central support for the circular cover plate 3, said plate being formed with a central aperture 4 which registers with a corresponding aperture in the upper end of the tubular post 2. The base 1 constitutes an oil chamber; and the cover plate 3 serves as a support for all of the operating mechanism except the main drive shaft which extends through and is journaled in the side of the base; and the transfer shaft which is geared directly to the drive shaft, this latter shaft being journaled in a suitable bearing formed in the bottom of the base as illustrated in Fig. 10.

Journaled in the cover plate and supported thereby are eight vertical transfer shafts 5, said shafts being arranged equal distances apart and concentrically around the center of the machine. Secured to each transfer shaft near its lower end and within the base 1, is a large pinion 6, all of said pinions intermeshing and constituting a train of gears insuring the rotation of the transfer shafts at a uniform speed with adjacent shafts rotating in opposite directions. In this way the alternate shafts will rotate in the same direction so that four of the shafts will be rotating in one direction; the other four shafts rotating in the opposite direction. On one of the transfer shafts is secured a beveled driving pinion 7 which meshes with a small beveled pinion 8 mounted on the main drive shaft 9. The drive shaft 9 extends through the side of the base 1 and carries, near its outer end, the belt wheel 10, said wheel being loosely mounted on the drive shaft and adapted to be connected thereto in driving relation by means of a friction clutch 11. This clutch may be of any suitable form and is adapted to be thrown into engagement with the driving wheel 10 by means of a spring 12, and to be disengaged therefrom by a clutch lever 13, as will be more fully hereinafter described. The lower end of the transfer shaft carrying the beveled pinion 7 is journaled in the bottom of the base 1; all of the other transfer shafts are journaled in and are supported by the cover plate 3.

Rigidly secured to each transfer shaft, above the cover plate, is a horizontal transfer disk 14, said disk being formed with four notches 15 in its periphery and at diametrically opposite points. Rigidly secured to each transfer shaft above the transfer disk is a circular carrier-gripping and holding means 16. The carrier-holding means comprises an annular sheet metal cup 17 having a flat horizontal bottom part and an upwardly and outwardly inclined frictional gripping part 18, said inclined part 18 and the upper surface of the carrier disk forming an inwardly tapering annular channel to receive the carrier disk and to frictionally grip it and hold it to the transfer device. In the sheet metal cup 17 is arranged a reinforcing disk 19 having a downwardly and inwardly beveled peripheral portion 20 which lies close to the upper surface of the inclined part 18 of the friction cup 17. There is a slight space between the beveled surface 20 of the reinforcing block 19 and the upper surface of the inclined part 18 of the friction cup, so that said inclined part may yield slightly, said cup being formed of resilient spring-like metal for this purpose. The friction cup 17 is considerably smaller in diameter than the transfer disk, so that while there will be a large bearing between the transfer disks and the carrier disks, as will be more fully hereinafter described, the engagement between the carrier disk and the friction cup will be only sufficient to afford a secure frictional holding means.

Secured to the center of the cover plate is a substantially star-shape guide plate 21, the edge of said plate adjacent each transfer shaft being formed of an arc concentric with said shaft. The cover plate is formed with an upstanding guide flange 22, said flange adjacent each transfer shaft being formed concentric with said shaft so that said flange is made up of a series of arc-shaped parts extending part-way around each of the transfer shafts. The guide plate 21 is formed with a central aperture 23 which registers with the aperture 4 of the cover plate so that there is a clear, central, vertical passage for the wire or other core about which the threads are to be braided.

The bobbin carriers consist of a vertical post 24 to which is rigidly secured, at a suitable point above their lower ends, a rigid horizontal base 25. To the post 24, below the base, is rigidly secured a carrier disk 26. This disk is preferably formed of wood or other suitable light, friction material, and is beveled on its upper surface around its periphery, as shown at 27, to provide a frictional surface adapted to be brought into contact with the under side of the beveled part 18 of the friction cup. The carrier disk is of a suitable thickness to permit its entrance into the space between the friction cup and the upper surface of the transfer disk 14, as clearly shown in Fig. 10 of the drawings. The carrier disk is formed with a depending hub or boss 28 which is adapted to enter the arc-shaped recesses or notches 15 in the transfer disks. The post 24 extends below the boss 28 and is adapted to be guided in its movement about the machine by the arc-shaped guide flanges 22 and the correspondingly shaped surfaces of the guide plate 21. Rigidly secured to the post 24 below the carrier disk is a laterally extending guide arm 29 which is formed with an upwardly extending guide finger 30 at its outer end, said finger being adapted to engage the peripheries of the transfer disks to prevent rotation of the post 24 and the carrier disk mounted thereon. These guide arms extend rearwardly, considered with respect to the direction of movement of the carriers about the machine; that is to say they extend in a direction opposite to the direction of movement of the carriers, as illustrated clearly in Figs. 8 and 9 of the drawings. The carrier disks 26 are of such diameter that they will frictionally engage two adjacent friction cups 17, as illustrated in Figs. 8 and 9, and will bridge the space between said cups as they pass from one transfer disk to the next in their movement about the machine. This bridging of the space between the friction cups of the transfer devices insures the positive holding of the carrier disks in the transfer means, said carrier disks being completely engaged with one transfer device before it is disconnected from the other one. Positively operating switch bars are employed to disconnect the carrier disks from one transfer device, said switch devices operating only when the carrier disk is firmly engaged with two adjoining transfer devices, so that at all times in the movement of the carriers they will be firmly held by the transfer devices.

Pivoted on the top of the cover plate are two sets of switch plates 31 and 32. The switch plates 31 are mounted on vertical pivots 33, journaled in the cover plate outside of the guide flange 22, and extend inwardly through slots 34 (see Fig. 6) in said flange. The switch plates 31 extend inwardly toward the center of the machine and lie between the transfer shafts, and have a limited lateral swinging movement. The switch plates 32 are secured to vertical pivots 35, mounted in the guide plate 21 and in the cover plate. The pivots 35 are radially in line with the pivots 33 and the switch plates 32 extend radially outwardly therefrom and have a limited lateral swinging movement. When the switch plates are radially in line they lie midway between adjacent transfer shafts, as shown clearly in Fig. 6. These switch plates are adapted to engage the lower ends of the posts 24 of the carriers and to serve as means for detaching the carrier disks from one transfer device and delivering them to the next transfer device in their movement around the machine, as will be more clearly set forth. Rigidly connected to each of the pivots 33 below the cover plate is a bell-crank lever 36, to one arm of which is connected an inwardly extending link 37. The inner end of the link 37 is connected to a crank arm 38 mounted on the pivot 35 of the coöperating switch 32, below the cover plate, so that the connected pivots 35 and 33 and the switch plates carried thereby will move in unison. One arm of the bell-crank lever 36 extends outwardly, and to its outer end is connected a link 39, the other end of said link being formed into a circular strap 40, which surrounds an eccentric 41 mounted upon a vertical stud 42. The studs 42 are rigidly secured at their upper ends in the cover plate, as shown in Fig. 7. Formed integral with the eccentric 41 is a pinion 43, said pinion meshing with the pinion 6 of the adjacent transfer shaft 5. It is manifest, therefore, that as the transfer shaft is rotated, the switches 31 and 32 will be swung back and forth in opposite directions across the radial line between the pivots of each radial pair of switch arms. Each alternate radial pair of switch arms are so mounted on their pivots that when they are radially in line the intervening pairs of switch arms will be swung to the limit of their lateral movement, as shown clearly in Fig. 6. This disposition and arrangement of the switch arms is desirable in order to secure the proper switching of the carrier disks from one transfer device to the next.

As shown in Fig. 1, sixteen bobbin carriers are preferably employed, eight of these carriers constituting one series arranged to move about the machine in a clockwise direction, as viewed in Fig. 1, the other eight constituting a second series arranged to move about the machine anti-clockwise, as viewed in Fig. 1. For convenience of reference, the series of carrier disks which move about the machine in a clockwise direction, as viewed in Figs. 1, 8 and 9, may be designated $a$, $a'$, $a^2$, $a^3$, $a^4$, $a^5$, $a^6$, and $a^7$; and the series which is arranged to move about the machine in an anti-clockwise direction are designated $b$, $b'$, $b^2$, $b^3$, $b^4$, $b^5$, $b^6$, and $b^7$.

In order to place the carriers in the machine the friction cups 17 must be first removed from the transfer shafts. This may be done readily by removing the nuts on the upper ends of said shafts. The carriers may be placed in position in the arrangement shown in Fig. 1, the hub 28 of each carrier disk being arranged within one of the locking recesses 15 of the transfer disks, the guide arm 29 being in engagement with the periphery of the transfer disk, and extending rearwardly when considered with respect to the direction of movement of the carrier around the machine. When the friction cups 17 are replaced in position on the transfer shafts, the carriers are locked in engagement with the transfer devices and cannot be removed from the machine without first detaching the friction cups. In Figs. 8 and 9 the arrows $x^a$ indicate the path of the $a$ series of carrier disks; the arrows $x^b$ indicate the path of the $b$ series of disks, and the arrows $x^c$ indicate the direction of rotation of the transfer disks. As shown in Fig. 8, the post 24 of the carrier disk $a'$ is in engagement with one of the switch arms 31, and the disk $a'$ has been disconnected from the friction cup at the left and is wholly carried by the transfer disk and friction cup at the right to which it is connected. The carrier disk $a^2$ is shown as approaching one of the switch arms 32, by which it will be detached from one carrier disk and left wholly supported by the next carrier disk of the series. When the posts of the carriers engage the switch arms, the carrier disks are in engagement with two of the transfer devices, so that said switch arms will not disconnect the carrier disks from one friction holding means until it is firmly engaged with the next carrier device of the series. The lower ends of the posts 24 travel close to the guide surfaces of the flange 22 and of the guide plate 21, in order to hold the hubs 28 of the carrier disks in the recesses 15 of the transfer disks, so that the carriers cannot accidentally be shifted or moved relatively to the transfer disks. The transfer disks are so timed in their rotation that the locking recesses 15 of one disk will register with the locking recesses of the adjacent disks and the hubs 28 will be first engaged in two registering recesses and then held by one of the switch arms positively in the locking recess of the next transfer disk to which it is being moved. After the passage of the carrier disk $a'$, as shown in Fig. 8, the switch arms will be reversed in position in order to divert the carrier disk $b'$ to its next transfer disk, as shown clearly in Fig. 9. As soon as the carrier disk $b'$ has passed the switch arms, said arms will be again reversed and returned to the position shown in Fig. 8, in order to divert the carrier disk $a$ from its transfer disk to the next transfer disk in the series. Each switch arm is alternately thrown across the path of the $a$ series of carrier disks, and then across the path of the $b$ series of carrier disks. At the time of transfer from one transfer disk to the next the carrier disks are supported by two transfer devices. As soon, however, as the transfer has been completed, the carrier disk will be supported wholly by one transfer device. The movements of the switch arms are properly timed with respect to the rotation of the carrier disks, and are driven directly from the carrier shafts, as shown clearly in Fig. 3. The guide arms 29 prevent the rotation of the carriers, and the upturned fingers 30 of said guide arms engage the periphery of first one transfer disk and then of the next, as the carriers are carried around the machine.

From the foregoing it is manifest that the carriers are not permanently or rigidly attached to any part of the machine, but are free to float or move from one transfer device to the next. It is also clear that the transfer devices operate uniformly upon all of the carriers, and that one set of transfer devices serves to drive the two series of carriers about the machine in opposite directions. The carrier disks are of sufficient diameter to cause them to be firmly engaged between two adjacent friction cups 17 as the carriers pass between said cups, so that they bridge the space between said cups and become firmly engaged therewith before they can be passed either outwardly or inwardly across the line between the carrier shafts. It is manifest that the "$a$" series of carriers will pass in a clockwise direction around the machine in an undulating line in and out around the transfer devices, and that the "$b$" series of carriers will pass in an anti-clockwise direction around the machine, also in an undulating line, and that the paths of the said two series of carriers will intersect between the transfer devices. The radial or in-and-out movement of the carriers will result in the usual over-and-under weaving of the threads from the bobbins.

The carrier post 24 extends above the base 25 and carries the bobbin or spool 46. Secured to the lower end of the spool is a ratchet 47, said ratchet wheel coöperating with a suitable spring-operated pawl to control the rotation of the spool. Loosely mounted on the post 24 below the ratchet wheel 47, is a take-up drum 48, said drum being provided with a suitable internally arranged spring, not shown, for exerting the proper tension on the thread. On the upper surface of the take-up drum is arranged a feed pin 51 and a stop pin 52. On the base 25 of the carrier is pivoted a feed-controlling pawl 53 which coöperates with the ratchet wheel 47. Mounted on the base 25 is a post 58 on which is arranged a slidable stop weight 59. The controlling pawl 53 is formed with an arm 60 which, in the normal operation of the machine, extends under and supports the stop weight.

The thread from the spool 46 passes over a vertical bar guide 61 and then through a central guide 62 on the post 58. From the guide 62 the thread is carried through a rigid loop guide 63 and thence around a hook guide 64 on the drum 48. From the take-up drum the thread is carried to a rigid guide 65 on the base of the carrier and thence to a loop guide 66 on the top of the post 58, from which latter guide the thread passes to the braiding point.

In the normal operation of the machine sufficient tension will be maintained on the thread by the take-up drum. Should the thread break the pawl 53 will be moved by one of the pins on the take-up drum sufficiently to release the arm 60 from the stop weight 69, thereby permitting the stop weight to drop to the base 25. In this position the weight will, at a suitable point in the travel of the carrier around the machine, engage means for releasing the clutch 11 and thereby stop the machine. The clutch releasing means is shown in Figs. 1, 4 and 5.

On the cover plate, at a point near the main drive shaft, is pivoted a horizontal, inwardly extending release lever 67, the inner end of said lever being in the path of the stop-weights when said weights are resting on the base 25 of the carriers. When the stop-weights are supported by the arm 60 of the controlling pawls, they are out of the path of the release lever 67, and it is only when they are released and dropped that they will be in position to engage said lever. As shown in Fig. 1, the release lever is in position to be engaged by the stop-weights of the carriers of both series, the travel of the stop-weights of both series across the lever being indicated by the dotted lines in said figure. The release lever 67 carries an outwardly extending arm 68, which normally engages and supports a clutch-operating weight 69. The weight 69 is mounted on a vertical post 70 of a lever 71. The lever 71 is provided with a depending arm 72, which is adapted to operate the clutch lever 13 through a crank arm 73. When the release lever 67 is engaged by one of the stop-weights it moves said lever and frees the arm 68 from the clutch-releasing weight 69. Said weight will then drop and give a quick, releasing movement to the clutch lever 13. Said clutch-releasing weight will also serve as a means for holding the clutch member 11 released.

The base of the machine is preferably formed as shown in Fig. 1, to provide an oil chamber below the carrier-supporting and moving means. It is preferred to have all of the gears and operating parts below the cover plate immersed in oil, in order to reduce friction and noise, and to provide a constant and uniform supply of lubricant. The carrier disks are preferably treated with paraffin, or some similar lubricating and preserving material. By forming these carrier disks of wood, the carriers are made very light, so that they may be driven at high speed around the machine without developing an undue centrifugal force, and with a minimum amount of noise.

As shown in Fig. 11, the transfer disk is formed with an annular channel 75 in its upper surface, and with a central, slightly elevated boss 76. Resting on this central boss is a friction disk 77 having its marginal edge inclined outwardly and downwardly and entering the annular channel 75. Above the friction disk is arranged a spacing collar 78 and said spacing collar carries a circular rigid clamping plate 79. The space between the friction disk and the clamping plate 79 is adapted to receive the edge of the carrier disk, as indicated in Fig. 11. The operation of the device is substantially the same as that shown in the other views, but it is thought that the clamping action is a little more positive and the carrier disk is mort firmly held in the frictional gripping means.

From the foregoing it is manifest that a machine constructed in accordance with this invention will be extremely simple and light. By reason of the fact that the transfer devices rotate and that the carriers freely float about the machine and are frictionally engaged by the carrier devices, the machine may be driven at high speed with a minimum amount of wear and noise.

What I claim is:

1. A braiding machine comprising a series of transfer disks, means for rotating said transfer disks, a friction gripping means carried by each transfer disk, a plurality of spool carriers, a carrier disk mounted on each of said carriers and adapted to be frictionally clamped between a friction gripping means and the transfer disk carrying said gripping means, and a pair of radial switch plates arranged between the transfer disks, one switch plate of each pair extending outwardly and the other plate of each pair extending inwardly and the operative faces of said switch plates being curved.

2. A braiding machine comprising spool carriers, a series of rotatable transfer devices adapted to engage said carriers, means for switching the carriers from one transfer device to the next in the series, and radial arms carried by the carriers and adapted to engage the edges of the transfer devices to prevent relative rotation of the carriers.

3. A braiding machine comprising two series of spool carriers, disks for moving said carriers around the machine, yielding frictional gripping means to connect the carriers to the moving disks, and arms carried by the carriers and adapted to prevent the rotation of the carriers, said arms being adapted to engage the edges of the transfer disks.

4. A braiding machine comprising a series of transfer disks, means for rotating said transfer disks, frictional gripping means carried by each transfer disk, a plurality of spool carriers, means mounted on each carrier and adapted to engage the frictional gripping means of the transfer disk, and guide means for holding the carriers to the transfer disks against the action of centrifugal force.

5. A braiding machine comprising a series of transfer disks, means for rotating said transfer disks, a friction cup carried by each transfer disk and formed with an upwardly and outwardly beveled yieldable wall, a plurality of spool carriers, a carrier disk mounted on each carrier and adapted to be frictionally clamped between the friction cup and the transfer disk, and switch devices arranged between the transfer disks and adapted to detach the carrier disks from one friction cup and cause them to move with the other engaged friction cup.

6. A braiding machine comprising a series of transfer disks, means for rotating said transfer disks, a circular friction cup of smaller diameter than the transfer disk and mounted centrally thereon and formed with an upwardly and outwardly beveled yieldable wall, spool carriers, a carrier disk mounted on each carrier and adapted to be frictionally clamped between the friction cup and the transfer disk, said carrier disk being adapted to engage the friction cups of two adjacent transfer disks as the carriers pass between said disks, switch devices arranged between the transfer disks and adapted to detach the carrier disks from one friction cup and cause them to move with the other engaged friction cup, and means mounted on the carrier and adapted to engage the transfer disks to prevent relative rotation of the carriers.

7. A braiding machine comprising a series of transfer disks, means for rotating said transfer disks, a circular friction cup of smaller diameter than the transfer disk and mounted centrally thereon and formed with an upwardly and outwardly beveled yieldable wall, spool carriers, a carrier disk mounted on each carrier and adapted to be frictionally clamped between the friction cup and the transfer disk, said carrier disk being adapted to engage the friction cups of two adjacent transfer disks as the carriers pass between said disks, switch devices arranged between the transfer disks and adapted to detach the carrier disks from one friction cup and cause them to move with the other engaged friction cup, and concentric stationary guide flanges for holding the carriers to the transfer disks against the action of centrifugal force.

8. A braiding machine comprising a series of transfer disks, means for rotating said transfer disks, a circular friction cup of smaller diameter than the transfer disk and mounted centrally thereon and formed with an upwardly and outwardly beveled yieldable wall, spool carriers, a carrier disk mounted on each carrier and adapted to be frictionally clamped between the friction cup and the transfer disk, said carrier disk being adapted to engage the friction cups of two adjacent transfer disks as the carriers pass between said disks, and a pair of radial switch plates arranged between the transfer disks and adapted to detach the carrier disks from one friction cup and cause them to move with the other engaged friction cup.

9. A braiding machine comprising a series of transfer disks, means for rotating said transfer disks, a circular friction cup of smaller diameter than the transfer disk and mounted centrally thereon and formed with an upwardly and outwardly beveled yieldable wall, spool carriers, a carrier disk mounted on each carrier and adapted to be frictionally clamped between the friction cup and the transfer disk, said carrier disk being adapted to engage the friction cups of two adjacent transfer disks as the carriers pass between said disks, a pair of radial switch plates arranged between the transfer disks and adapted to detach the carrier disks from one friction cup and cause them to move with the other engaged friction cup, and means connecting said switch plates to the transfer disk rotating means.

10. A braiding machine comprising a series of transfer disks formed with peripheral locking notches, means for rotating said transfer disks, a circular friction cup of smaller diameter than the transfer disk and mounted centrally thereon and formed with an upwardly and outwardly beveled yieldable wall, spool carriers, means on the carriers to engage the locking notches of the transfer disks, a carrier disk mounted on each carrier and adapted to be frictionally clamped between the friction cup and the transfer disk, said carrier disk being adapted to engage the friction cups of two adjacent transfer disks as the carriers pass between said disks, switch devices arranged between the transfer disks and adapted to detach the carrier disks from one friction cup and cause them to move with the other engaged friction cup, and guiding means to hold the carriers engaged in the locking notches of the transfer disks.

11. A braiding machine comprising a series of transfer disks formed with peripheral locking notches, means for rotating said transfer disks, a circular friction cup of smaller diameter than the transfer disk and mounted centrally thereon and formed with an upwardly and outwardly beveled yieldable wall, spool carriers, means on the carriers to engage the locking notches of the transfer disks, a carrier disk mounted on each carrier and adapted to be frictionally clamped between the friction cup and the transfer disk, said carrier disk being adapted to engage the friction cups of two adjacent transfer disks as the carriers pass between said disks, switch devices arranged between the transfer disks and adapted to detach the carrier disks from one friction cup and cause them to move with the other engaged friction cup, guiding means to hold the carriers engaged in the locking notches of the transfer disks, and a radially extending guiding arm mounted on each carrier and adapted to engage the transfer disks to hold the carrier against relative rotation.

12. A braiding machine comprising a series of transfer disks, means for rotating said disks, a yieldable circular friction device mounted centrally on each transfer disk and of smaller diameter than said disk, a plurality of spool carriers, a carrier disk of absorbent material impregnated with a lubricant and mounted on each spool carrier and adapted to be frictionally clamped between one friction device and its transfer disk, and switch devices adapted to detach the spool carriers from one friction device and to cause them to travel with the next adjacent friction device.

13. A braiding machine comprising a series of transfer disks, means for rotating said disks, a series of spool carriers adapted to be moved about the machine by the transfer disks, and a radially extending guiding arm mounted on each spool carrier and adapted to hold the carrier against relative rotation, said guiding arm extending rearwardly with respect to the direction of motion of the carrier.

14. A braiding machine comprising a series of transfer disks notched at diametrically opposite points, means for rotating said transfer disks, frictional gripping means carried by each transfer disk, a plurality of spool carriers each having a central depending hub adapted to be engaged in the notches of the transfer disks, means mounted on each carrier and adapted to engage the frictional gripping means on the transfer disks, a radial guide arm connected to each of said hubs and adapted to engage the edges of the transfer disks to prevent relative rotation of the spool carriers, and stationary guide means concentric with the transfer disks and adapted to hold the carriers to the transfer disks against the action of centrifugal force.

This specification signed this twenty-fifth day of November, A. D. 1918.

EUGENE T. TURNEY.